US 6,556,203 B1

(12) United States Patent
Nelson

(10) Patent No.: US 6,556,203 B1
(45) Date of Patent: Apr. 29, 2003

(54) TILE-BASED DIGITAL DIFFERENTIAL ANALYZER RASTERIZATION

(75) Inventor: Scott R. Nelson, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 09/608,414

(22) Filed: Jun. 30, 2000

(51) Int. Cl.[7] .............................................. G06T 11/20
(52) U.S. Cl. ........................................................ 345/443
(58) Field of Search ................................. 345/440, 441, 345/443

(56) References Cited

U.S. PATENT DOCUMENTS

| | | | | | |
|---|---|---|---|---|---|
| 5,307,449 A | * | 4/1994 | Kelley et al. | ............... | 345/419 |
| 5,446,836 A | * | 8/1995 | Lentz et al. | ................. | 345/441 |
| 5,528,737 A | * | 6/1996 | Sfarti | ........................... | 345/441 |
| 5,544,294 A | * | 8/1996 | Cho et al. | ................... | 345/426 |
| 5,684,941 A | * | 11/1997 | Dye | ............................ | 345/441 |
| 5,982,384 A | * | 11/1999 | Prouty et al. | ................ | 345/441 |
| 6,072,505 A | * | 6/2000 | Piazza et al. | ............... | 345/443 |
| 6,285,376 B1 | * | 9/2001 | Choi et al. | ................... | 345/441 |
| 6,421,053 B1 | * | 7/2002 | Johns et al. | ................ | 345/441 |

* cited by examiner

Primary Examiner—Jeffery Brier
Assistant Examiner—Ryan Yang
(74) Attorney, Agent, or Firm—Blakely, Sokoloff, Taylor & Zafman LLP

(57) ABSTRACT

A method, apparatus, and system are described for rasterizing a triangle. Pixel parameter values are interpolated by adding or subtracting a vertical delta or by adding or subtracting a horizontal delta within a 4×4 tile of 16 pixels.

3 Claims, 7 Drawing Sheets

TILE-BASED DIGITAL DIFFERENTIAL ANALYZER RASTERIZATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates to the field of computer graphics, and more specifically, to rasterization using a tile-based digital differential analyzer algorithm.

BACKGROUND OF THE INVENTION

Generally, the field of three-dimensional (3D) computer graphics is concerned with generating and displaying 3D objects in a two-dimensional (2D) space, such as a display screen. This is accomplished by converting information about 3D objects into a bit map that is displayed. This process is called rendering, a multi-part process by which a computer turns an application model description of an image into a screen image. The basic idea is that the processing of information in three-dimensional computer graphics occurs in a series of stages in a graphics pipeline, where each stage generates results for a successive stage.

The process starts with an application model for describing an object using three-dimensional coordinates (x, y, z), where the object is defined by large numbers of basic geometrical shapes called primitives that define the shape of components of the object. Examples of primitives that make up an object include a triangle, line, dot, circle, ellipse, arc, text, polyline, and polygon. In addition to primitives, an application model stores object attributes such as size, color, line, width, and surface texture, as well as connectivity relationships and positioning data that describe how the components fit together.

The application model for a given object is created by an application program, and stored in an application database. Using a graphics API (application programming interface), a series of graphics output commands that contain both a detailed geometric description of what is to be viewed and the attributes describing how the objects should appear, the application program converts the application model to a sequence of commands, which are then processed by a graphics pipeline to generate a view of the model. The graphics API typically consists of a set of output subroutines corresponding to the various primitives, attributes, and other elements, which are all collected in a graphics package that can be called from high-level languages such as C, Pascal, or LISP.

The basic element of any graphics system is rasterization, the process by which a primitive is converted to a two-dimensional image on a raster device. A raster device, such as a computer monitor, comprises a raster, the rectangular area of a display screen actually used to display images. A raster is itself made up of pixels, short for picture elements, the smallest units by which a primitive can be represented on a display. Pixels are activated on a raster device as an electron beam sweeps across the device to generate a picture one scan line at a time.

During rasterization, a primitive that is defined by 3D parameters in a three-dimensional (3D) representation is converted into a two-dimensional raster of pixels. 3D parameters comprise x, y, and z coordinates, and may optionally comprise parameters such as color, depth, and texture. During rasterization, each x and y parameter is converted into an x coordinate and a y coordinate. The 3D z coordinate, and any other parameters are then interpolated into 2D values.

One of the problems to be solved during the rasterization process is computing the 3D parameters, such as the Z coordinate, color, and texture, corresponding to the coordinates in order to most closely approximate the three-dimensional primitive. Rasterization, which is also known as scan conversion, makes these determinations by scanning the horizontal or vertical scan lines of the grid.

The rasterization process can be a costly and inefficient process, sometimes requiring many multiplication computations. While several algorithms exist, the process is commonly the subject of optimization algorithms.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
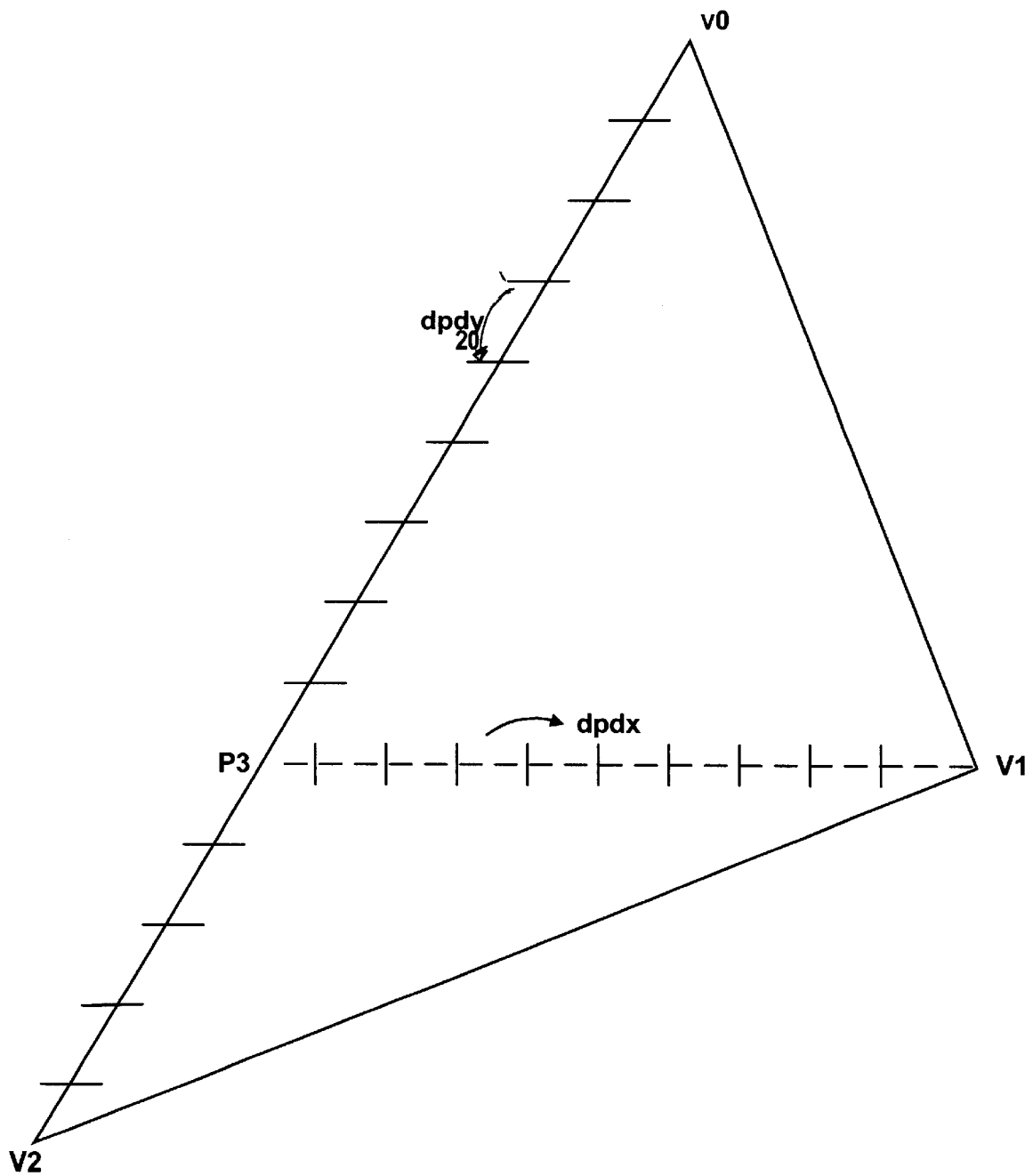
FIG. 1 illustrates a triangle primitive and boundaries.

According to one aspect of the invention, a rasterization method to convert geometric values of a triangle to pixels is described. A plurality of set-up computations are performed, and then the boundaries of a triangle on a grid are determined. A triangle is rasterized by interpolating down the vertical axis of a triangle and across the horizontal axis of the triangle within a block of pixels.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium includes any mechanism for storing or transmitting information in a form readable by a machine (e.g., a computer). For example, a machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

In rasterization, x and y define the triangle in screen space, with all the other parameters being interpolated to find their values at a specific point in screen space. There are two major parts to a rasterization process: edge interpolation, where valid pixels (i.e., pixels which fall inside of the primitive boundaries), and pixel parameter computation, where the x, y, and z coordinates are determined., as well as any other given parameters are determined.

i740 Tile-Based Rasterization

A scan conversion technique by Intel called I740 scan converts a primitive a block, also known as a tile, at a time rather than a pixel at a time. Pixels are divided into tiles, such as a 4×4 tile of 16 pixels. Starting from a first tile, valid pixels are found within the first tile. Once the tile is completed, a next tile is evaluated. Tile-based rasterization is computed as follows:

1. Compute the bounding box of the triangle.
2. Locate the top-most vertex, start span (ss), and reference point (the center of the top left pixel in ss.
3. Normalize the parameters.
4. Compute the area of the triangle using the determinant of the matrix:

$$a = \begin{vmatrix} 1 & 1 & 1 \\ x0 & x1 & x2 \\ y0 & y1 & y2 \end{vmatrix}$$

5. "Perform face culling using a, where the triangle is culled if a<=0 for counterclockwise triangles, and a>=0 for clockwise triangles".
6. Locate the top-most vertex, and rotate the vertices counterclockwise.
7. Compute the three edge equations as follows:

$L0 = Lx*X + Ly*Y$ where
Lx=*deltaX manDistRecip;
Ly=deltaY * manDistRecip
deltaX=X1−X0;
deltaY=Y1−Y0;
manDist=abs(deltaX)+abs(deltaY);
manDistRecip=1.0/manDist.

8. Compute the parameter plane equation as follows:

$P0 = C0 + C1*x0 + C2*y0$ $P1 = C0 + C1*x1 + C2*y1$ $P2 = C0 + C1*x2 + C2*y2$

Using Cramer's rule, the coefficients for the plane equation can be computed as follows:

$$C_0 = \frac{\begin{vmatrix} p_0 & p_1 & p_2 \\ x_0 & x_1 & x_2 \\ y_0 & y_1 & y_2 \end{vmatrix}}{a}$$

$$C_1 = \frac{\begin{vmatrix} 1 & 1 & 1 \\ p_0 & p_1 & p_2 \\ y_0 & y_1 & y_2 \end{vmatrix}}{a}$$

$$C_2 = \frac{\begin{vmatrix} 1 & 1 & 1 \\ x_0 & x_1 & x_2 \\ p_0 & p_1 & p_2 \end{vmatrix}}{a}$$

Rather than generate all of the pixels to be rendered, a scan conversion unit first generates all of the blocks overlapped by the triangle as follows:

1. Locate the block containing the top vertex, and mark this as the start position.
2. Scan left until the termination condition is true.
   Termination condition means a) the bounding box of the triangle has been exceeded; b) the center of the block is more than 8/2 negative units away from one of the edges (i.e., there is one edge whose distance function evaluated at the center of the block is less than −k/2).
3. Go back to the start position and scan right until the termination condition is true.
4. Set the new start position to the ideal place to start the scan in the next line, and continue processing at 1.
   Ideal place to start the scan on the next line is the block whose bottom center is closest to the center of the triangle. This is done by tracking the block with the maximum of minimum distance to all three edges.

Once a block is generated, the distance functions for the edges are used to determine if a pixel is inside the triangle. All three distance functions have to be positive (or all three negative) for a pixel to lie inside the triangle. The distance functions can be evaluated using direct evaluation or interpolation The same thing applies to the generation of the parameters for the pixels. In i740, the parameter value for the top most pixel is directly evaluated using the plane equations for the parameter while the other pixels in the block are interpolated. To avoid having to scan through every pixel in the block (if any are visible), i740 stores multiple interpolation step sizes in both x and y. (If pixel n is visible, n+1 is not, and n+2 is, then the parameter value for n+2 can be interpolated by adding the stored two step value rather than require n+1 to be interpolated first).

DDA Rasterization

Traditionally, a triangle is rasterized by interpolating down the triangle edges to each scan line (y direction), finding the first valid pixel on that scan line, and determining that pixel's value (x, y, z, color, texture, etc.). The next pixel's value on that scan line is determined by stepping across the x axis one pixel at a time (step value in the x direction), and then computing each pixel's value at that scan line. This method is known as the digital differential analyzer (hereinafter "DDA") method. The step value for each parameter in the y direction across the longest edge of the triangle, and in the x direction is determined through setup calculations. In reference to FIG. 1, the setup computation in DDA is determined as follows:

1. Calculate parameter deltas dpdy20 for stepping down the longest edge of the triangle.
   Determine the longest edge.
      Sort vertices in top to bottom order: v0, v1, V2
      Using the y coordinates of the vertices, calculate the vertical lengths between vertices to determine which edge is the longest, where Lab represents the length from vertex a to vertex b.
         L02=12.75
         L01=7.25
         L12=5.5
   In this example, the edge from vertex 2 to vertex 0 is the longest edge of the triangle.
   Determine parameters p at V0.
      x=10.75
      y=14.75
      v0.v[i], where i=z, texture, color, etc.
   Determine the slope (m20) of the longest edge.

$dx20=v2.v[PVERT\_X]-v0.v[PVERT\_X];$ where v2.v[PVERT_X] is the x coordinate at vertex 2, and v0.v[PVERT_X] is the x coordinate at vertex 0.

$dy20=v2.v[PVERT\_Y]-v0.v[PVERT\_Y];$ $rdy20=1/dy20;$ $dxdy20=dx20*rdy20;$ $m20=1/dxdy20$ Determine X start point for longest edge.

$x02=v0.v[PVERT\_X]+yOff0*dxdy20;$

Determine the parameter delta (dpdy20), i.e. the amount by which a parameter will change when stepping down the longest edge of the triangle.

$dp20=v2.v[i]-v0.v[i];$ $dpdy20=dp20*rdy20;$

Determine offset (yoff)-from y-coordinate at V0.

$y02=(int)v0.v[PVERT\_Y]+1.0F$ $yoff=v0.v[PVERT\_Y]-y02$

Calculate parameter values at first scan line below V0 on the longest edge of the triangle (p02 [i]), where i represents a given one of one or more parameters.

$p02[i]=v0.v[i]+yOff0*dpdy20[i];$

2. Calculate the parameter delta dpdx, i.e., the amount by which given parameter i will change when stepping across the horizontal axis.
   Compute distance across the widest part of the triangle (dx13).

$p3Ratio=dy21*rdy20;$ where $dy21=v2.v[PVERT\_Y]-v1.v[PVERT\_Y]$ and $rdy20=1/dy20;$ $xAtP3=v2.v[PVERT\_X]-p3Ratio*dx20;$ $dx13=xAtP3-v1.v[PVERT\_X]$ Divide the distance by the number of steps (pixels).

$rdx13=1.0f/dx13;$ $pAtP3[i]=v2.v[i]-p3Ratio*dp20[i];$ $dp13[i]=v1.v[i]-pAtP3[i];$ $dpdx[i]=dp13[i]*rdx13;$ 3. Determine triangle boundaries.
   2. Compute the edge slopes and initial x values of the two shorter edges. The other parameters are not needed for the other two edges, since it only needs to know when to stop stepping across the scan line.

$dx01=v0.v[PVERT\_X]-v1.v[PVERT\_X];$ where v0.v[PVERT_X] is the x coordinate at vertex 0, and v1.v[PVERT_X] is the x coordinate at vertex 1.

$dy01=v0.v[PVERT\_Y]-v1.v[PVERT\_Y];$ $rdy01=1/dy01;$ $dxdy01=dx01*rdy01;$ $m01=1/dxdy01$ $dx12=v1.v[PVERT\_X]-v2.v[PVERT\_X];$ where v1.v[PVERT_X] is the x coordinate at vertex 1, and v2.v[PVERT_X] is the x coordinate at vertex 2.

$dy12=v1.v[PVERT\_Y]-v2.v[PVERT\_Y];$ $rdy12=1/dy12;$ $dxdy12=dx12*rdy12;$ $m12=1/dxdy12$ Compute initial X value for each of the edges.

$x01=v0.v[PVERT\_X]+yOff0*dxdy01;$ $x12=v1.v[PVERT\_X]+yOff1*dxdy12;$

4. Starting at first scan line below the V0, step across current scan line and compute pixel values.
   3. Determine if the triangle is drawn to the left or the right of the longest edge.
   Determine the distance across the triangle at its widest point (dx13).
      If dx13<0.0, then the triangle is scanned to the right. Otherwise, the triangle is drawn is scanned to the left.
      Adjust p02[i] by distance on horizontal axis from point on edge of triangle to nearest pixel sample point.
      Multiply parameter values p02 [1] on longest edge of the triangle on the first scan line by step value dpdx until the right edge of the triangle is reached (as determined by the slope of the right edge).
5. Start next scan line by stepping down long edge of triangle by multiplying current parameter value by dpdy20.
   At the beginning of triangle processing, the starting values of the long edge, and the starting values of the first short edge are loaded. The step values (dpdy20, dpdx) are also loaded.

If it is a left scan triangle, then processing proceeds as follows:

xOff=fractional bits of initial X

SpanX=x−xOff (integer bits of initial X)

SpanCount=integer bits of X minus integer bits of Xe xStep=−1

If it is a right scan triangle, then processing proceeds as follows:

xOff=1−fractional bits of initial X

SpanX=x+xOff (integer bits of initial X)

SpanCount=integer bits of Xe minus integer bits of X xStep=1

The Y value is already set from the setup computations and is incremented by 1 as each line is scanned.

The following equation computes the starting value of each of the parameters:

$$SpanP=p+dpdx*xOff$$

where p is the parameter value at the triangle edge and dpdx is the horizontal step value computed in the setup stage.

While SpanCount is greater than 0, draw a pixel at the current X, Y coordinate, then add the dpdx values to all parameters and subtract one from SpanCount. Once all of the pixels of the span have been drawn, all parameters are stepped down the edge one by adding the dpdy20 values. (There is a separate dpdy20 value for each parameter.)

Finally, the count representing the remaining length of the opposite edge is decremented by one. If the result is greater than 0, processing continues as described above. If the result is 0, then the edge parameters and initial values for the second edge are loaded, and processing for the second edge is initiated as described above for the first edge. When the count reaches 0 for the second edge, the triangle has been rasterized, and another triangle can be loaded.

While tile-based rasterization only evaluates tiles having pixels, the computations required to determine the boundaries of the triangle are rather complex. While the computations in DDA rasterization are much less complex, the determination of which pixels are valid is inefficient since every pixel on a scan line is evaluated to determine if it is valid.

In tile-based DDA rasterization of the present invention, valid tiles are determined and their values computed by interpolating down the vertical axis of a triangle to each scan line in the y direction (rather than the longest edge of the triangle), and stepping across the x axis one pixel at a time in the x direction within a tile (rather than across an entire scan line), where a tile comprises a predetermined block of pixels. Depending on how much parallelism is in the tile rasterization hardware, either all samples within a tile can be computed first, and then the valid ones selected, or samples can first be checked for validity, and their values computed only if they are valid samples. In preferred embodiments, a tile comprises a 4×4 block of 16 pixels, 8 samples values are computed per cycle, and then the valid pixels from the 8 computed values are then selected.

The step value for each parameter down the vertical axis of the triangle in the y direction, and across the horizontal axis of the triangle in the x direction are both determined through setup computations.

Set-Up Computations

Figure 2:
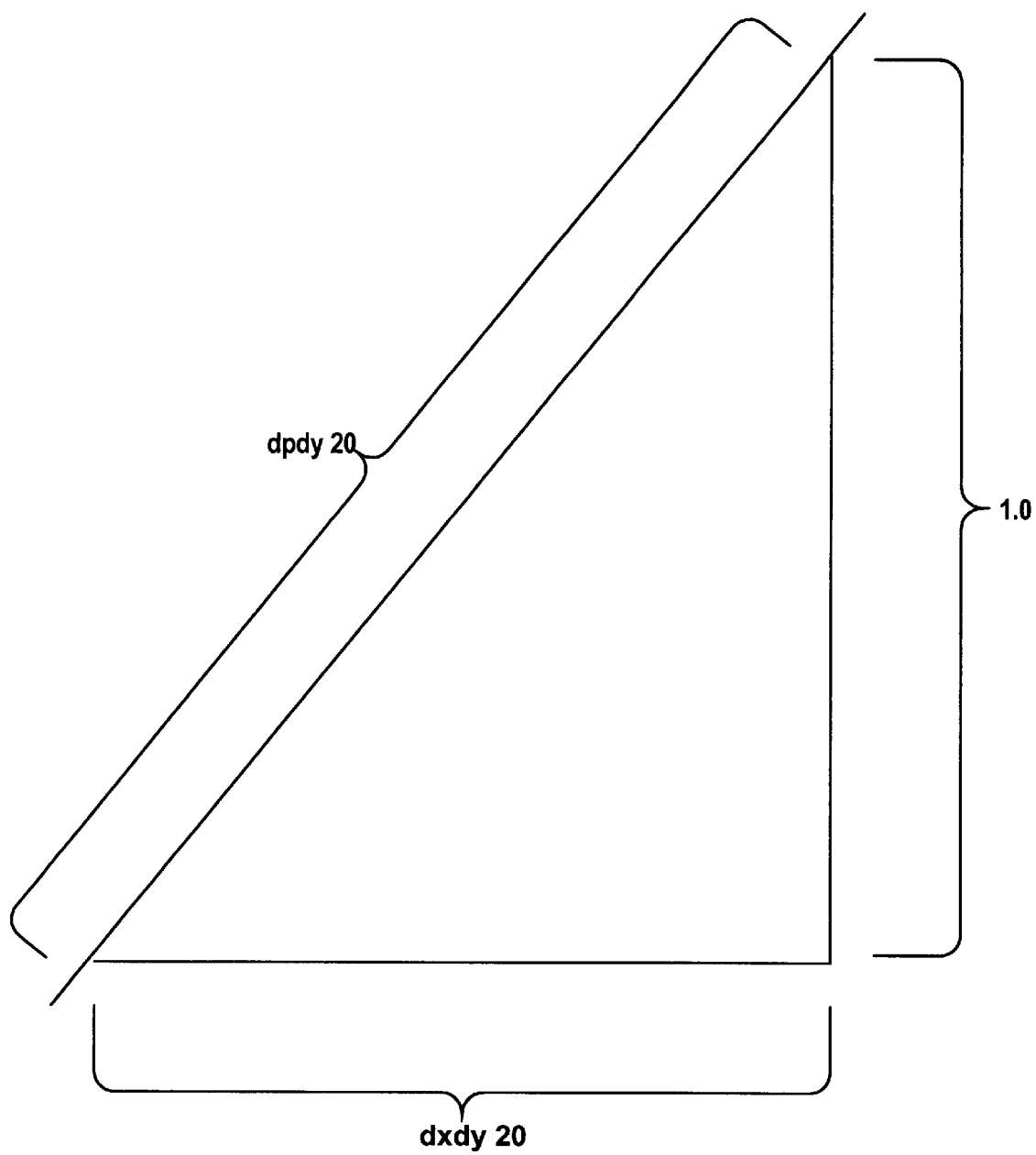
FIG. 2 illustrates a section of the triangle primitive shown in FIG. 1.

The setup computation in DDA is determined as follows:
1. Calculate parameter deltas dpdy (instead of dpdy20) for stepping down the vertical axis of the triangle. As shown in FIG. 2, dpdy20 represents one step down the long edge of the triangle for a distance of 1.0 in y. The value dxdy20 represents the change in X of the long edge for a distance of 1.0 in the y direction. This ratio of 1.0/dxdy20 is the slope of the edge. All of the dpdy20 values differ from the pure vertical dpdy by this slope.

Subtracting the slope ratio of the horizontal parameter component (dxdy20*dpdx) from the edge delta (dpdy20) produces the vertical delta values at a cost of one add and one multiply per parameter:

Calculate parameter deltas dpdy20 for stepping down the longest edge of the triangle.

Determine the longest edge.

Sort vertices in top to bottom order: V0, V1, V2

Using the y coordinates of the vertices, calculate the vertical lengths between vertices to determine which edge is the longest.

Determine parameters p at V0.

Determine slope at the longest edge (dpdy20).

Determine X start point for longest edge.

Determine offset (yoff) from y-coordinate at V0.

Calculate parameter values at first scan line below V0 on the longest edge of the triangle (p02[i]), where i represents a given one of one or more parameters.

Calculate the parameter delta dpdx for stepping across the horizontal axis.

Compute distance across the widest part of the triangle.

Divide the distance by the number of steps (pixels).

dpdy=dpdy20−dxdy20*dpdx

2. Compute the edge slopes and initial X values of the two shorter edges in order to determine the triangle boundaries.

Rasterization

Figure 3:
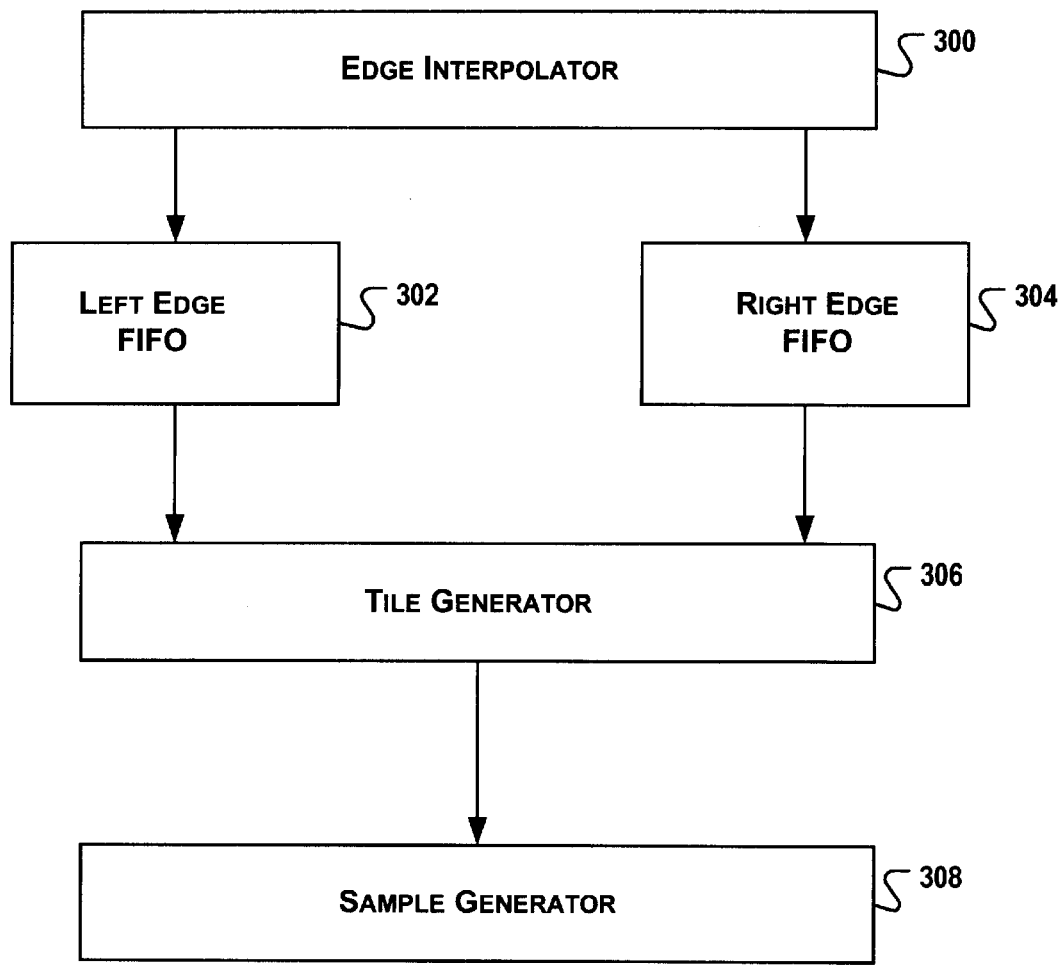
FIG. 3 shows components of tile-based ODA rasterization in preferred embodiments of the invention.

As shown in FIG. 3, an edge interpolator 300 determines the bounds of a triangle by storing leftmost points from each scan line in the Left Edge FIFO 302, and the rightmost points from each scan line in the Right Edge FIFO 304. Using these points, a tile generator 306 determines the leftmost tile and the rightmost tile to process. A sample generator 308 then determines pixel values.

Figure 4:
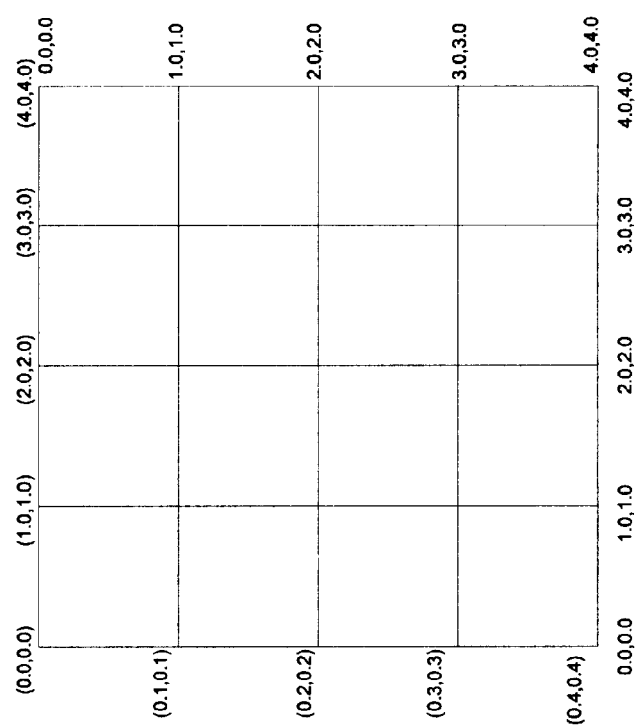
FIG. 4 shows a raster grid.

A triangle is rasterized in subsets of pixels called tiles. In preferred embodiments, a tile comprises a 4×4 block of 16 pixels. FIG. 4 illustrates a given tile in a raster, where the circles represent positions of valid sample points for pixels within the tile. In this illustration, a pixel is a valid sample point if the pixel's center falls on the grid line. In other embodiments, however, the pixel center may fall between the grid lines, or elsewhere in the grid without departing from the scope of the invention. A sample value between 0.0 and 4.0, including 0.0, belongs to this tile −(0.0, 0.0), (1.0, 0.0), (2.0, 0.0), (3.0, 0.0), (0.0, 1.0), (1.0, 1.0), (2.0, 1.0), (3.0, 1.0), (0.0, 2.0), (1.0, 2.0), (2.0, 2.0), (3.0, 2.0), (0.0, 3.0), (1.0, 3.0), (2.0, 3.0), (3.0, 3.0), and all values in between −, and a sample value of exactly 4.0 belongs to the next tile (0.0, 4.0), (1.0, 4.0), (2.0, 4.0), (3.0, 4.0), (4.0, 0.0), (4.0, 1.0), (4.0, 2.0), (4.0, 3.0), (4.0, 4.0), and all values in between.

Figure 5:
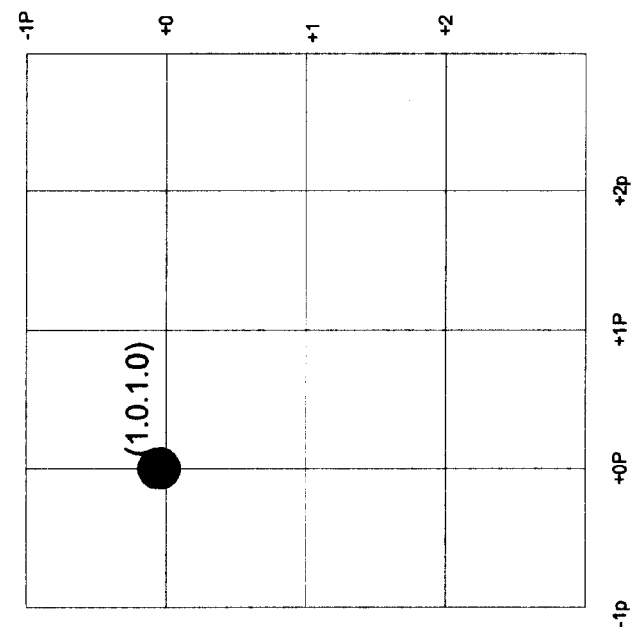
FIG. 5 shows a base parameter.
Figure 6:
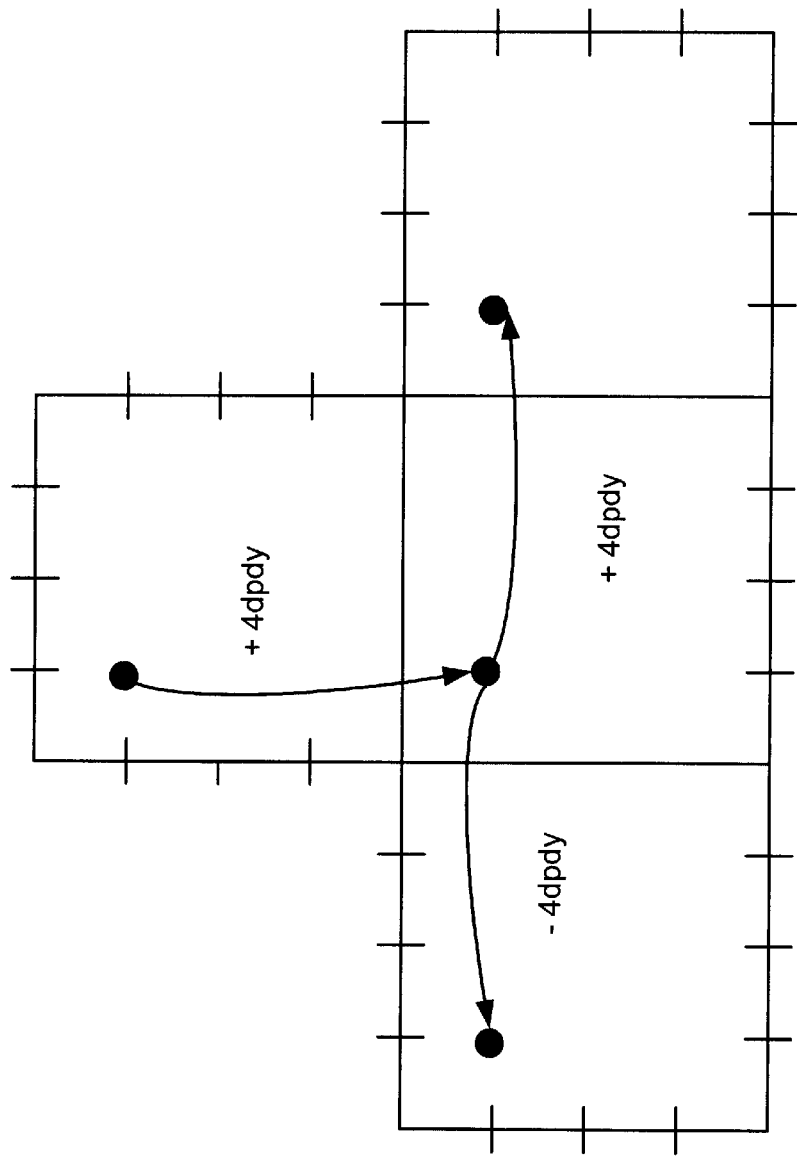
FIG. 6 shows movement between pixels in a raster grid.

Parameter values are computed at a base position within a tile as shown in FIG. 5. The base position is a position from which other valid sample points within the tile may be computed by adding or subtracting the parameter delta, or by adding 2 times the parameter delta. As shown in FIG. 6, to step from one tile to the next requires adding 4 times dpdy to go down to the next tile, or adding or subtracting 4 times dpdx to go left or right. In preferred embodiments, the base position is the point (1.0, 1.0).

Calculating Starting Parameter

Figure 7:
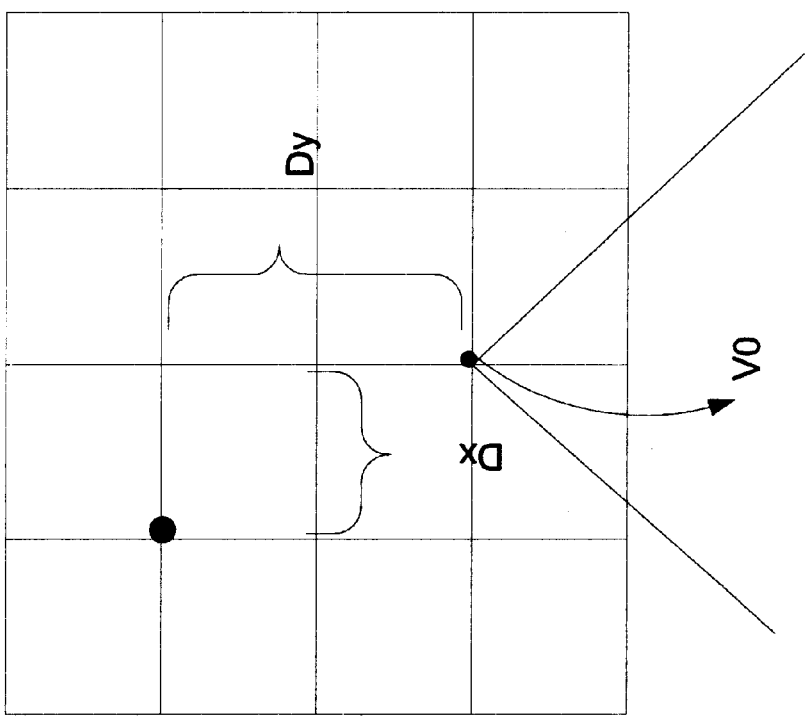
FIG. 7 illustrates computing a base parameter from the top vertex of a triangle primitive.

A base parameter value is determined by finding the tile comprising the top vertex, V0. As illustrated in FIG. 7, the parameters at V0 are then adjusted by the x coordinate distance and the y coordinate distance from V0 to the base position. The equation to determine the base parameter is as follows:

$$pBase = p0 - Dx*dpdx - Dy*dpdy$$

All subsequent parameter value computations are available using simple additions of dpdx and dpdy, or two or four times those values.

Determining Triangle Boundaries

An edge interpolator steps down the triangle edges and stores the left-most and right-most x values into the Left Edge FIFO (First-In-First-Out) Unit and the Right Edge FIFO Unit for each step in Y down the triangle.

Starting at the top vertex, V0, step down the left, longest edge of the triangle by dpdy20, and compute x at that scan line using the point-slope equation:

$$(y-y_1) = m(x-x_1)$$

If x falls on a valid sample point, then its value is stored in the left edge FIFO. If not, then its integer value is added to 1.0 and the result is stored in the left edge FIFO.

For the right edge, start at the top vertex, V0, step down the right edge of the triangle by dpdy20, and compute x at that scan line using the point-slope equation:

$$(y-y_1) = m(x-x_1)$$

If x falls on a valid sample point, then its value is stored in the right edge FIFO. If not, then its integer value is stored in the right edge FIFO.

Figure 8:
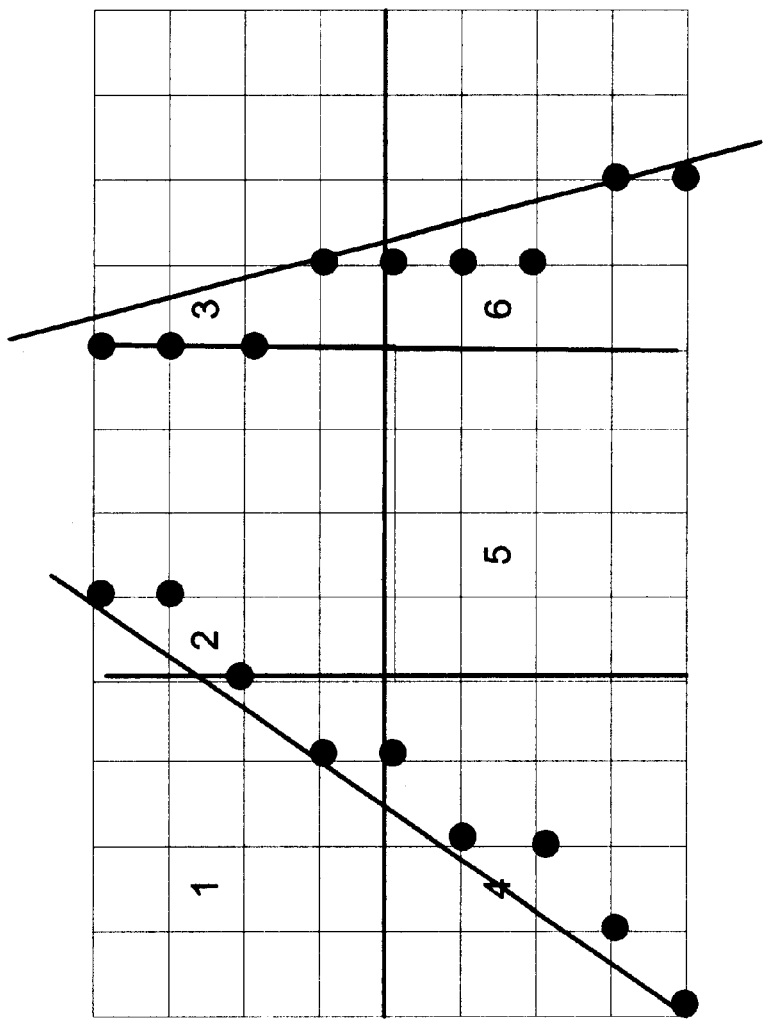
FIG. 8 illustrates edge interpolation.

FIG. 8 shows raster tiles that are occupied by a subset of the edges of the triangle below the top vertex. Starting at the scan line below the top vertex, the edge interpolator unit steps down the left triangle edge by the value dpdy20 to Tile 2. Since the x and y value at the top vertex, V0, is known, the x value can be calculated using the point-slope equation shown above. Since the x value falls on a pixel center the x value is stored in the Left Edge FIFO. The edge interpolator unit then steps down the left edge by dpdy20 to Tile 2 again. Since the x value does not fall on a pixel center, the integer of the x value is added to 1.0, and the result stored in the Left Edge FIFO. The edge interpolator unit steps down the left edge by dpdy20 to Tile 1 this time. Since the x value does not fall on the pixel center, its integer value is added to 1.0 and the value stored in the Left Edge FIFO.

For the right edge, the edge interpolator starts at the scan line below the top vertex, and steps down the right triangle edge by the value dpdy12 to Tile 3. Since its x value does not fall on a pixel center, its integer value is stored on the Right Edge FIFO. The edge interpolator steps down the right triangle edge to Tile 3 again for the next four scan lines, storing x values in the Right Edge FIFO as described above.

Tile Generation

To begin rasterizing the triangle, a tile generation unit starts interpolating values from the base parameters in the tile containing the top-most vertex. Since the values for the base parameters have already been determined previously, it is just a matter of adding or subtracting dpdx and dpdy values to get from one pixel to another. In one embodiment, it is first determined if the pixel is valid, i.e., if the pixel falls in the boundaries of the triangle, and then the value of the pixel is determined. In preferred embodiments, using parallel hardware, it is first determined what the value of the pixels are, and then it is determined which pixels are valid.

Determining Valid Tiles

To determine valid tiles, i.e., which tiles to visit during rasterization, a tile generator unit determines the leftmost and rightmost tile in each row. For each four-line region, the rightmost valid sample and a leftmost valid sample are determined by the slope of the edges. For the left edge, a positive edge slope (x decreases as y decreases) indicates that the bottom scan line comprises the leftmost point, and a negative edge slope (x increases as y decreases) indicates that the top scan line comprises the leftmost point. For the right edge, a positive edge slope (x decreases as y decreases) indicates that the top scan line comprises the rightmost point, and a negative edge slope (x increases as y decreases) indicates that the bottom scan line comprises the rightmost point. For the four-line region comprising the middle vertex, the same rules above apply if both edges have positive slopes or both edges have negative slopes. However, if one edge has a positive slope, and the other edge has a negative slope, then the middle vertex itself is the rightmost or the leftmost point.

The tiles comprising the leftmost and rightmost points are stored, such that any tile that exists to the left of the leftmost tile in a four line region is not visited, and any tile that exists to the right of the rightmost tile in a row is not visited. Since the base parameter value is already known, processing starts with moving from one pixel to a pixel above by adding dpdy, or to a pixel below by subtracting dpdy. Likewise, determining values from one pixel to a left pixel is calculated by subtracting dpdx, and determining values from one pixel to a right pixel is calculated by adding dpdx. Processing terminates when there are no more x values to be processed in both Left Edge FIFO and Right Edge FIFO.

Determining Valid Samples

To determine exactly which samples are valid within a tile, all tiles within a row are numbered from left to right starting from binary 00, 01, 10, 11, etc., and rows and columns within a tile are numbered in binary units. The tile number comprising the leftmost x value is compared to all but the lower two bits of the x value. If the x value is greater than or equal to the tile number, then the sample is valid. For tiles that have a lower address, no samples are valid. For tiles that have a greater address, all samples are valid. When the address is equal, the lower two bits are checked. These may then be used directly to mask the valid samples. FIG. 7 shows "x" for invalid samples and "•" for valid samples. Simple digital logic converts the address bits to sample masks.

The right edge valid sample values are computed in a similar manner. The resulting masks must be logically ANDed to determine the final valid samples if both edges are inside the same tile.

What is claimed is:

1. A system comprising:

a raster;

an edge interpolator coupled to the raster to scan the scan lines of the raster;

a left first-in-first-out (FIFO) unit coupled to the edge interpolator to store leftmost values of a triangle scanned by the edge interpolator;

a right FIFO unit coupled to the edge interpolator to store rightmost values of the triangle scanned by the edge interpolator;

a tile generator coupled to the left FIFO unit and to the right FIFO unit to determine the leftmost tile from the leftmost values and the rightmost tile from the rightmost values; and a sample generator to determine valid pixel samples on the raster based on the leftmost values and the rightmost values.

2. A system as in claim 1, wherein the tile generator determines the leftmost values and the rightmost values within a 4×4 tile of 16 pixels.

3. A system as in claim 1, wherein the sample generator determines the value of 8 pixels per cycle, and then determines which of the 8 pixels are valid.

* * * * *

UNITED STATES PATENT AND TRADEMARK OFFICE
CERTIFICATE OF CORRECTION

PATENT NO. : 6,556,203 B1
DATED : April 29, 2003
INVENTOR(S) : Nelson

It is certified that error appears in the above-identified patent and that said Letters Patent is hereby corrected as shown below:

Column 2,
Line 29, delete "ODA", insert -- DDA --.

Column 3,
Line 53, delete "deltaA", insert -- deltaX* --.

Signed and Sealed this

Thirtieth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,556,203 B1 Page 1 of 1
DATED : April 29, 2003
INVENTOR(S) : Nelson It is certified that error appears in the above-identified patent and that said Letters Patent is hereby corrected as shown below:

Column 2,
Line 29, delete "ODA", insert -- DDA --.

Column 3,
Line 53, delete "*deltaX", insert -- deltaX* --.

Signed and Sealed this

Fourteenth Day of October, 2003

JAMES E. ROGAN
*Director of the United States Patent and Trademark Office*